United States Patent
Shimizu et al.

(10) Patent No.: US 12,221,521 B2
(45) Date of Patent: Feb. 11, 2025

(54) PLANT-DERIVED POLYAMIDE-BASED ELASTOMER FOAM MOLDED BODY, METHOD FOR MANUFACTURING SAME, AND FOAM PARTICLES THEREOF

(71) Applicant: SEKISUI PLASTICS CO., LTD., Osaka (JP)

(72) Inventors: Daisuke Shimizu, Osaka (JP); Yuichi Gondoh, Osaka (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 734 days.

(21) Appl. No.: 17/598,583

(22) PCT Filed: Mar. 16, 2020

(86) PCT No.: PCT/JP2020/011434
§ 371 (c)(1),
(2) Date: Sep. 27, 2021

(87) PCT Pub. No.: WO2020/196020
PCT Pub. Date: Oct. 1, 2020

(65) Prior Publication Data
US 2022/0153949 A1 May 19, 2022

(30) Foreign Application Priority Data
Mar. 28, 2019 (JP) ................. 2019-062331

(51) Int. Cl.
| C08J 9/232 | (2006.01) |
| B29C 44/44 | (2006.01) |
| B29K 77/00 | (2006.01) |
| C08G 81/02 | (2006.01) |
| C08J 9/12 | (2006.01) |
| C08J 9/14 | (2006.01) |
| C08J 9/18 | (2006.01) |

(52) U.S. Cl.
CPC ............ *C08J 9/232* (2013.01); *B29C 44/445* (2013.01); *C08G 81/028* (2013.01); *C08J 9/122* (2013.01); *C08J 9/141* (2013.01); *C08J 9/18* (2013.01); *B29K 2077/00* (2013.01); C08G 2110/0058 (2021.01); C08G 2110/0066 (2021.01); C08J 2203/06 (2013.01); C08J 2203/14 (2013.01); C08J 2203/22 (2013.01); C08J 2387/00 (2013.01)

(58) Field of Classification Search
CPC ... C08J 9/232; C08J 9/122; C08J 9/141; C08J 9/18; C08J 2203/06; C08J 2203/14; C08J 2203/22; C08J 2387/00; B29C 44/445; C08G 81/028; C08G 2110/0066; C08G 2110/0058; B29K 2077/00
USPC .......................................................... 521/58
See application file for complete search history.

(56) References Cited

U.S. PATENT DOCUMENTS

| 2017/0283555 A1* | 10/2017 | Takano ...................... C08J 9/18 |
| 2018/0368515 A1 | 12/2018 | Yamade et al. |
| 2019/0071570 A1* | 3/2019 | Cocquet .................. C08J 9/146 |
| 2019/0203009 A1 | 7/2019 | Keppeler et al. |

FOREIGN PATENT DOCUMENTS

| DE | 10 2014 216 992 | 3/2016 | |
| FR | 3 062 653 | 2/2017 | |
| JP | 2013-155225 | 8/2013 | |
| JP | 2013-185074 | 9/2013 | |
| JP | 2013185074 A * | 9/2013 | |
| JP | 5703249 | 4/2015 | |
| JP | 5919841 | 5/2016 | |
| JP | 6081674 | 2/2017 | |
| JP | 2017-226765 | 12/2017 | |
| JP | 2018-75753 | 5/2018 | |
| WO | 2008/072514 | 6/2008 | |
| WO | 2016/052387 | 4/2016 | |
| WO | WO-2016052387 A1 * | 4/2016 | ............ B29C 44/00 |
| WO | 2017/220671 | 12/2017 | |

OTHER PUBLICATIONS

Pebax Thermoplastic polyamide elastomers, 2015, pp. 1-20, cited in the ISR.
International Search Report issued Jun. 9, 2020 in International Application No. PCT/JP2020/011434.
Extended European Search Report issued Nov. 2, 2022 in corresponding European Patent Application No. 20777948.9.
Rui Huang et al., Plastics Engineering Handbook, vol. 1, pp. 290-291, 2000, with partial English translation.
Zude Li et al., Applied Manual of Plastic Processing Technology, pp. 201-202, 1997, with partial English translation.

* cited by examiner

Primary Examiner — Michael M. Bernshteyn
(74) Attorney, Agent, or Firm — WENDEROTH, LIND & PONACK, L.L.P.

(57) ABSTRACT

A foam molded body having a rebound resilience coefficient equivalent to that of a petroleum-derived polyamide-based elastomer foam molded body, and excellent moldability during in-mold foaming; foam particles; and a method for producing the foam molded body. A polyamide-based elastomer foam molded body comprising 50 to 100 mass % of a block copolymer resin containing a polyamide block as a hard segment and a polyether block as a soft segment, wherein the copolymer resin has a biobased product content as measured by ASTM D6866 of 30% or more.

9 Claims, No Drawings

PLANT-DERIVED POLYAMIDE-BASED ELASTOMER FOAM MOLDED BODY, METHOD FOR MANUFACTURING SAME, AND FOAM PARTICLES THEREOF

TECHNICAL FIELD

The present invention relates to a plant-derived polyamide-based elastomer foam molded body, a method for producing the same, and plant-derived polyimide-based elastomer foam particles.

BACKGROUND ART

Elastomers are positioned as engineering elastomers because of their excellent rebound resilience and high mechanical strength, and are considered for use in a variety of applications including household goods, electrical appliance parts, sports goods, automobile parts, and construction and civil engineering components. Since a molded body obtained by foaming such an elastomer is expected to be lightweight and have high rebound resilience that the elastomer originally has, Patent Literature 1, for example, reported a method in which foam particles prepared from an elastomer resin are fused and foamed in a mold, thus molding a molded body.

CITATION LIST

Patent Literature

PTL 1: JP2018-075753A

SUMMARY OF INVENTION

Technical Problem

Since most elastomer foam molded bodies use a petroleum-derived resin as a base resin, there is a demand for an elastomer foam molded body with high rebound resilience and low environmental load.

An object of the present invention is to provide a foam molded body having a rebound resilience coefficient equivalent to that of a petroleum-derived polyamide-based elastomer foam molded body, and excellent moldability during in-mold foaming; foam particles; and a method for producing the foam molded body thereof.

Solution to Problem

To solve the above problems, the present inventors conducted extensive research. As a result, they found that by using, as a base resin of foam particles, a polyamide-based elastomer comprising 50 to 100 mass % of a block copolymer resin containing a polyamide block as a hard segment and a polyether block as a soft segment, wherein the block copolymer resin has a biobased product content of 30% or more, a polyamide-based elastomer foam molded body having a rebound resilience coefficient equivalent to that of a petroleum-derived polyamide-based elastomer foam molded body, and excellent moldability during in-mold foaming can be obtained. The present invention is based on such findings, and representative present inventions are described below.

1. A polyamide-based elastomer foam molded body comprising 50 to 100 mass % of a block copolymer resin containing a polyamide block as a hard segment and a polyether block as a soft segment, the copolymer resin having a biobased product content as measured by ASTM D6866 of 30% or more.
2. The foam molded body according to Item 1, which is an in-mold foam molded body.
3. The foam molded body according to Item 1 or 2, comprising the copolymer resin in an amount of 70 to 100 mass %.
4. The foam molded body according to any one of Items 1 to 3, wherein the copolymer resin has a shore D hardness of 25 to 75.
5. The foam molded body according to any one of Items 1 to 4, wherein the polyamide block is polyamide 11 derived from castor oil.
6. The foam molded body according to any one of Items 1 to 5, having a density of 0.05 to 0.3 $g/cm^3$.
7. The foam molded body according to any one of Items 1 to 6, having rebound resilience coefficient of 30 to 80%.
8. The foam molded body according to any one of Items 1 to 7, wherein the copolymer resin has a biobased product content as measured by ASTM P6866 of 40% or more.
9. The foam molded body according to any one of Items 1 to 7, wherein the copolymer resin has a biobased product content as measured by ASTM D6866 of 30 to 80%.
10. The foam molded body according to any one of items 1 to 9, wherein the biobased product content as measured by ASTM D6866 is 15% or more.
11. The foam molded body according to any of Items 1 and 3 to 10, which is not an extrusion foam molded sheet.
12. Polyamide-based elastomer foam particles for in-mold foam-molding,
    wherein
    the foam particles comprising 50 to 100 mass % of a block copolymer resin containing a polyamide block as a hard segment and a polyether block as a soft segment, and the copolymer resin having a biobased product content as measured by ASTM D6866 of 30% or more.
13. The foam particles according to Item 12, having an average particle size of 1 to 5 mm.
14. A method for producing a polyamide-based elastomer in-mold foam molded body, wherein the foam particles according to Item 12 or 13 are introduced into a mold, followed by heating and foaming.

Advantageous Effects of Invention

The present invention can provide a polyamide-based elastomer foam molded body that is excellent as an elastomer because it has a low environmental load due to a high biobased product content, and moldability and a rebound resilience coefficient (e.g., 30 to 80%) equivalent to that of a petroleum-derived polyamide-based elastomer foam molded body; a production method thereof; and foam particles for producing the polyamide-based elastomer foam molded body.

The present invention can also provide a polyamide-based elastomer foam molded body having a higher maximum point stress and elongation at break than those of a petroleum-derived poly amide-based elastomer foam molded body; a production method thereof; and foam particles for producing the polyamide-based elastomer foam molded body.

The present invention particularly provides an in-mold foam molded body having low environmental load, and high rebound resilience, maximum point stress, and elongation at break; a production method thereof; and foam particles suitable for the production of the in-mold foam molded body.

DESCRIPTION OF EMBODIMENTS

In this specification, the numerical values of physical properties, contents, and the like of materials, intermediate products, final products, etc. are determined by the specific methods described in the Examples, when the Examples describe the specific methods.

(1) Block Copolymer Resin

The block block copolymer resin is a copolymer resin containing a polyamide block as a hard segment, and a polyether block as a soft segment. Examples of polyamides constituting the hard segment include polycondensation polyamides, such as ε-caprolactam, 11-aminoundecanoic acid, and 12-aminolauric acid, and copolymerization polyamides of dicarboxylic acids such as adipic acid, sebacic acid, terephthalic acid, and isophthalic acid with diamines such as hexamethylenediamine, nonanediamine, and methylpentadiamine; and like polyamide structures.

Examples of polyethers constituting the soft segment include polyether structures derived from polyethylene glycol, polypropylene glycol, polytetramethylene glycol, and the like.

The polyamide block and the polyether block may be randomly dispersed.

As the block copolymer resin, from the viewpoint of reducing environmental load and improving the rebound resilience coefficient of the foam molded body, a castor oil-derived block copolymer resin is preferred, and a pant-derived resin in which 11-aminoundecanoic acid obtained from castor oil is used to form a polyamide block (castor oil-derived polyamide 11) is more preferred. When 11-aminoundecanoic acid obtained from castor oil is used to form a polyamide block, a polytetramethylene glycol is preferably used to form a polyether block, from the viewpoint of improving the rebound resilience coefficient of the foam molded body.

The biobased product content of the block copolymer resin, as measured by ASTM 06866, can be set to, for example, 30% or more, 40% or more, or 30 to 80%; preferably 40 to 80%; and more preferably 40 to 70%. When the biobased product content is within the above range, a decrease in the rebound resilience coefficient can be suppressed while increasing the biobased product content of the foam molded body.

The content of the block copolymer can be 50 to 100 mass % in a base resin or in a foam molded body, and is preferably 70 to 100 mass %. By setting the content within the above range, the environmental load is further reduced, and the rubber elasticity and moldability that can be demonstrated as a thermoplastic elastomer are improved.

The block copolymers can be used singly, or in a combination of two or more.

The shore D hardness of the block copolymer resin varies depending on the ratio of the hard segment to the soft segment, and the shore D hardness increases as the proportion of the polyamide block increases.

The shore D hardness (ISO 868) of the block copolymer resin is preferably 25 to 75, more preferably 40 to 60. By setting the hardness within the above range, the compatibility between hardness and rubber elasticity is further increased.

The melting point (ISO 11357) of the block copolymer resin is preferably 130 to 190° C., and more preferably 140 to 170° C.

The melt mass flow rate (MFR) of the block copolymer resin can be, for example, 20 to 50 g/10 min, preferably 30 to 50 g/10 min, and more preferably 35 to 45 g/10 min.

The block copolymer resin is preferably a resin having a melting point of 130 to 190° C., a melt mass flow rate of 30 to 50 g/10 min, a biobased product content of 30% or more, and a shore D hardness of 25 to 75.

(2) Polyamide-Based Elastomer Foam Particles

The polyamide-based elastomer foam particles comprise 50 to 100 mass % of the block copolymer resin having a biobased product content of 30% or more as measured by ASTM D6866.

The base resin used as a raw material for foam particles comprises the block copolymer resin preferably in an amount of 50 to 100 mass %.

The base resin may comprise only one, or two or more block copolymer resins mentioned above.

The base resin may comprise two or more block copolymer resins having a different biobased product content, or may comprise a resin having a biobased product content of 0%.

The base resin may include other resins, such as other amide-based resins, polyether resins, styrene-based elastomers, olefin-based elastomers, ester-based elastomers, and the like, in addition to the aforementioned block copolymer resins, to an extent that the effects of the present invention are not impaired.

The resin particles may include a flame retardant, coloring agent, antistatic agent, spreading agent, plasticizer, cross-linking agent, filler, lubricant, and the like, in addition to the base resin.

Examples of the flame retardant include hexbromocyclododecane and triallyl isocyanurate 6 bromide.

Examples of the colorant include inorganic pigments such as carbon black, graphite, iron oxide, and titanium oxide; organic pigments such as phthalocyanine blue, quinacridone red, and isoindolinone yellow; special pigments such as metallic powder and pearl; and dyes.

Examples of The antistatic agent include polyoxyethylene alkylphenol ether and stearic acid monoglyceride.

Examples of the spreading agent include polybutene, polyethylene glycol, silicon oil, and the like.

The foam, particles preferably have a bulk density in the range of 0.015 to 0.5 g/cm$^3$. The bulk density is more preferably 0.02 to 0.3 g/cm$^3$, and even more preferably 0.05 to 0.2 g/cm$^3$.

The shape of the foam particles is not particularly limited, and examples include spherical, elliptically spherical (oval), columnar, prismatic, pellet-like, and granular-like shapes.

The average particle size of the foam particles is not particularly limited as long as the desired foam molded body can be obtained. It is preferably 1 to 5 mm, and more preferably 1 to 3 mm. When the average particle diameter is within the aforementioned range, the production of foam particles is easy, the secondary foaming properties during molding are not easily reduced, the property of being filled into a mold when a foam molded body is produced by heat-foaming is not easily reduced, and a foam molded body having a complicated shape is easily produced.

The foam particles ensures a reduction in environmental load. The foam particles axe also useful as a raw material for the production of a foam molded body with a reduced environmental load and a rebound resilience coefficient.

The foam particles may be used as a raw material for a foam molded body to be foamed in a mold, or may be used as is as a filler in a cushion.

(3) Polyamide-Based Elastomer Foam Molded Body

The polyamide-based elastomer foam molded body comprises 50 to 100 mass % of a block copolymer resin, i.e., a block copolymer resin containing a polyamide block as a hard segment and a polyether block as a soft segment, and having a biobased product content of 30 mass % or more as measured by ASTM D6866.

The foam molded body is preferably obtained by in-molding the foam particles, and is composed of multiple fused bodies of foam particles.

The foam molded body preferably comprises the block copolymer resin in an amount of 70 to 100 mass %, and more preferably 80 to 100 mass %. When the content of the block copolymer resin is within the above range, the environmental load caused by the foam molded body is reduced, and the rebound resilient coefficient of the foam molded body Is relatively increased.

The foam molded body may comprise only one, or two or more block copolymer resins.

The foam molded body may comprise two or more block copolymer resins mentioned above each having a different biobased product content, or may comprise a resin having a biobased product content of 0%.

The foam molded body may comprise other resins, such as other amide-based resins, polyether resins, styrene-based elastomers, olefin-based elastomers, ester-based elastomers, and the like, in addition to the block copolymer resins, to an extent that the effects of the present invention are not impaired.

In addition to the above, the foam molded body may also comprise a flame retardant, coloring agent, antistatic agent, spreading agent, plasticizer, cross-linking agent, filler, lubricant, and the like, to an extent that the effects of the present invention are not impaired.

By containing 50% or more of the block copolymer resin, or by producing the foam molded body from the base resin or foam particles, the rebound resilience coefficient can be set to, for example, 30 to 80%, preferably 40 to 80%, and more preferably 50 to 80%.

The biobased product content of the foam molded body as measured by ASTM D6866 can be set to 15% or more.

The density of the foam molded body is, for example, 0.05 to 0.3 g/cm$^3$, preferably 0.08 to 0.2 g/cm$^3$, and more preferably 0.10 to 0.15 g/cm$^3$. When the density is in the above range, an excellent rebound resilient coefficient can be obtained without sacrificing the lightweight properties.

The maximum point stress of the foam molded body can be set to, for example, 1.0 to 2.0 MPa, preferably 1.1 to 1.9 MPa, and more preferably 1.2 to 1.8 MPa. The maximum point stress being within the above range is advantageous in that the foam molded body is not easily broken when the stress is applied, and has high flexibility.

The elongation at break of the foam molded body can be set to, for example, 40 to 100%, preferably 42 to 90%, and more preferably 44 to 85%. The elongation at break being within the above range is advantageous in that the foam molded body is not easily broken when the stress is applied, and has suitable hardness.

The foam molded body can be used in industrial fields, sports goods, cushioning materials, bed core materials, seat cushions (cushions for sheets), and automotive parts (automobile interior parts etc.). In particular, the foam molded body can be used for applications where environmental load reduction and rebound resilience improvement are desired. Examples include shoe midsole, insole, and outsole parts; core materials for hitting tools of sports goods such as rackets and bats; protectors for sports goods such as pads and, protectors; medical, nursing, welfare, or health care products such as pads and protectors; tire core materials for bicycles, wheelchairs, and the like; interior materials, seat core materials, shock-absorbing materials, and vibration-absorbing materials for automobiles, railroad vehicles, airplanes, and other transportation equipment; fenders; floats; toys; flooring materials; wall materials; beds; cushions; and transport containers for electronic components, various industrial materials, food, etc.

The foam molded body can take an appropriate foam according to the above application.

(4) Production Method of Polyamide-Based Elastomer Foam Molded Body

The foam molded body can be obtained, for example, by introducing foam particles comprising a base resin into a cavity formed of a pair of molds in which a steam inlet-provided first mold is combined with a second mold; and heating the molds and the foam particles with a heating medium to foam the foam particles, thereby filling gaps between the foam particles, and allowing the foam particles to be fused to each other and unified.

During the filling of foam particles, the density of the foam molded body can be adjusted, for example, by adjusting the amount of foam particles by controlling the cracking rate between the first and second molds. The cracking rate is, for example, 3 to 85%, preferably 5 to 85%, and more preferably 10 to 80%. When the cracking rate is in this range, the degree of beauty of appearance can be adjusted. The method for identifying the cracking rate is as follows.

Cracking Rate

Using the in-mold volume a (cm$^3$) with a pair of molds being completely closed, and the in-mold volume b (cm$^3$) in which cracking is taken out, the cracking rate is obtained based on the following equation.

$$\text{Cracking rate } (\%) = ((b - a)/a) \times 100$$

In heat-molding, it is preferable that the foam particles are impregnated with an inorganic gas to improve the foaming power of the foam particles (internal pressure application step). By improving the foaming power, the fusion between foam particles is improved during heat foaming, and the foam molded body further has excellent mechanical strength and long-term dimensional stability. An inorganic gas is, for example, an inert gas or air. Examples of the inert gas include carbon dioxide, nitrogen, helium, argon, and the like. Preferable examples of inorganic gas include air, nitrogen, and carbon dioxide.

The amount of the inorganic gas contained in the foam particles is, for example, 0 to 2 mass %, preferably 0.1 to 1.5 mass %, and more preferably 0.2 to 1.3 mass %, relative to the mass of the foam particles containing the inorganic gas. When the amount of the inorganic gas is within the above range, the fusion rate is increased and excellent appearance is attained, thus increasing productivity.

Examples of the method for impregnating an inorganic gas into the foam particles include a method for impregnating an inorganic gas into the foam particles by placing the foam particles in an atmosphere of an inorganic gas at an atmospheric pressure or higher. It is preferable to leave the foam particles to stand for 1 minute to 24 hours in an inorganic gas atmosphere at 0.01 MPa to 2.0 MPa, more preferably 5 min to 24 hours, and particularly preferably 20 min to 18 hours. The foam particles may be impregnated with an inorganic gas before being introduced into a mold, or may be impregnated with an inorganic gas etc. by placing a mold in which the foam particles have been introduced in an atmosphere of an inorganic gas etc.

In the case where the foam particles are impregnated with an inorganic gas, the foam particles may be heated and foamed in the mold without any treatment. However, they may also be heated and foamed before being filled in the mold to make foam particles having a high foaming ratio; and then filled in the mold, followed by heating and foaming. The use of such foam particles with a high foaming ratio ensures a foam molded body with a high foaming rate.

(5) Production Method of Foam Particles

Foam particles to be filled in a mold can be obtained through the step of impregnating the particles of the base resin with a foaming agent to obtain foamable particles (impregnation step) the step of foaming the foamable particles; and optionally, the step of applying an internal pressure so that the foam particles contain an inorganic gas.

(5-1) Impregnation Step (a) Resin Particles

The resin particles can be obtained by using known production methods and equipment.

For example, resin particles can be produced by granulating a molten mixture of resin extruded from an extruder by underwater cutting, strand cutting, or the like. The temperature, time, pressure, etc. during melt-kneading can be set as appropriate for raw materials to be used and production equipment.

The melt-kneading temperature in the extruder during melt-kneading is a temperature at which the resin is sufficiently softened. Therefore, it can be set appropriately according to the resin to be used. The melt kneading temperature is preferably 170 to 260° C., and more preferably 200 to 250° C. The melt-kneading temperature refers to the temperature of a melt-kneaded product inside an extruder, which is obtained by measuring the temperature at the center of the melt-kneaded product flow channel near the extruder head with a thermocouple thermometer.

Examples of the shape of the resin particles include spherical, elliptically spherical (oval), columnar, prismatic, pellet-like, and granular-like shapes.

The resin particles preferably have an L/D of 0.8 to 3, wherein the length thereof is L and the average diameter thereof is D. The resin particles with an L/D in this range ensure an excellent property of being filled in a mold. The length L of the resin particles refers to the length a resin particle in the extrusion direction, and the average diameter D refers to the diameter of the cut surface of a resin particle substantially perpendicular to the direction of the length L.

The average diameter D of the resin particles is preferably 0.5 to 1.5 mm. When the average diameter D is 0.5 mm or more, the holding properties of the foaming agent are likely to be improved, and the foaming properties of the foamable particles are likely to be improved. When the average diameter D is 1.5 mm or less, the property of being filled in a mold is likely to be improved, and the thickness of the foam molded body when produced in the form of a plate can be easily increased.

(b) Foamable Particles

Foamable particles are produced by impregnating resin particles with a foaming agent. As the technique of impregnating resin particles with a foaming agent, a known technique can be used. Examples include a method in which resin particles, a dispersant, and water are supplied to an autoclave; and the mixture is stirred to disperse the resin particles in water, thus obtaining a dispersion, to which a foaming agent is added under pressure to thus impregnate the foaming agent into the resin particles.

Examples of dispersants include, but are not particularly limited to, poorly water-soluble inorganic substances, such as calcium phosphate, magnesium pyrophosphate, sodium pyrophosphate, magnesium oxide, hydroxyapatite; and surfactants such as sodium dodecylbenzene sulfonate.

The foaming agent may be a general-purpose foaming agent. Examples include air; inert gases such as nitrogen and carbon dioxide (carbon dioxide gas); aliphatic hydrocarbons such as propane, butane, and pentane; and halogenated hydrocarbons. Air, inert gases, or aliphatic hydrocarbons are preferred. The foaming agents may be used singly, or in a combination of two or more.

The amount of the foaming agent to be impregnated into the resin particles is preferably 1 to 15 parts by mass, based on 100 parts by mass of the resin particles. When the amount of the foaming agent is 1 part by mass or more, the foaming power is not reduced, and excellent foaming is possible even when the foaming ratio is high. When the amount of the foaming agent is 15 parts by mass or less, breakage of the cell membrane is suppressed, and The plasticizing effect is prevented from, overly increasing. Thus, the excessive reduction in the viscosity during foaming is suppressed, and shrinkage is suppressed. The amount of the foaming agent is more preferably 2 to 12 parts by mass. Within this range, the foaming power can be sufficiently enhanced, and more excellent foaming is possible even when the foaming ratio is high.

The temperature of impregnating the resin particles with the foaming agent is preferably 10 to 120° C., and more preferably 20 to 110° C. When the impregnation temperature of the foaming agent is within this range, the time required for impregnating the resin particles with the foaming agent is not increased, and production efficiency is not easily reduced; or resin particles are not fused to each other, and the generation of bonded particles is suppressed. A foaming auxiliary agent (plasticizer) can be used in a combination with the foaming agent. Examples of the foaming auxiliary agent (plasticizer) include diisobutyl adipate, toluene, cyclohexane, ethyl benzene, and the like.

(5-2) Foaming Step (c) Foam Particles

In the foaming step, the foaming temperature and a heating medium are not particularly limited, as long as foam particles are obtained by foaming foamable particles.

Before foaming, an anti-fusing agent, such as polyamide powder, a surfactant (e.g., polyoxyethylene polyoxypropylene glycol), or an antistatic agent may be applied to the surface of the foamable particles in order to suppress the aggregation of foam particles.

EXAMPLES

The present invention is described in detail below with reference to Examples. However, the present invention is not limited to these embodiments.

Method for Measuring Physical Properties

The physical properties described in the Examples were specified by the following method.

Biobased Product Content

The biobased product content was measured by ASTM D6866.

Melting Point of Base Resin

The melting point of the base resin was ISO 1157.

Shore D Hardness of Base Resin

For the shore D hardness of the base resin, the instantaneous value was measured by ISO 868.

Density of Base Resin

The density of the base resin was measured by ISO 1183.

Melt Mass Flow Rate (MFR) of Base Resin

A sample of a base resin (shape: pellets, size: 4.0 mm 3.0 mm×2.5 mm) was vacuum-dried at 100° C. for 3 hours, then hermetically sealed and stored in a desiccator until just before measurement. The melt mass-flow rate was measured by "b) Method for measuring time during which piston travels predetermined distance" described in the B method for JIS K 7210:1999 "Plastics-Determination of the melt mass-flow rate (81FR) and the melt volume-flow rate (MVR) of thermoplastics." Specifically, a "Melt Flow Index Tester 120-SAS" (produced by Yasuda Seiki Seisakusho Ltd.) was used, and the measurement conditions were sample: 3 to 8 g, preheating: 300 seconds, load hold: 30 seconds, test temperature: 230° C., test load: 21.18 N, and piston travel distance (interval): 25 mm. The number of tests was 3, and their average was taken as the value of melt mass-flow rate (g/10 min).

Impregnation Amount of Gas (Butane Gas) in Foamable Particles (Amount of Foaming Agent)

After impregnation with butane gas as a foaming agent, the obtained foamable particles were immediately weighed for mass W1 (g), and allowed to stand for 24 hours at a temperature of 23±2° g and a humidity of 50±5%. Thereafter, mass W2 (g) of the foamable particles was weighed, and the impregnation amount of gas was calculated according to the following equation.

Impregnation amount of gas in foamable particles (mass %)=((W1−W2)/W1)×100

Bulk Density of Foam Particles

Foam particles (W g) before internal pressure application were weighed as a measurement sample, and the measurement sample freely fell in a measuring cylinder. Thereafter, the bottom of the measuring cylinder was tapped to obtain a constant apparent volume V (cm$^3$) of the sample, and the weight and volume were measured. The bulk density of the foam particles was then calculated based on the following equation.

Bulk density (g/cm$^3$) =

Weight of measurement sample($W$)/volume of measurement sample($V$)

Amount of Inorganic Gas (Nitrogen Gas) in Foam Particles

Foam particles that filled 70% of the volume of the hermetically sealed container were weighed, and put into a hermetically sealed container. After the container was hermetically sealed, pressurization was performed using an inorganic gas with a gauge pressure of 0.01 MPa to 2 MPa for an arbitrary amount of time. After the pressurization, the inorganic gas was purged until the inside of the hermetically sealed container reached atmospheric pressure, and the foam particles were taken out and weighed. The amount of inorganic gas was calculated according to the following equation.

Amount of inorganic gas (mass %) = $((b-a)/b) \times 100$ a: Weight (g) of foam particles before pressurization with inorganic gas b: Weight (g) of foam, particles after pressurization with inorganic gas Average Particle Size of Foam Particles About 50 g of foam particles were classified for 5 minutes with VIS standard sieves having sieve openings of 26.5 mm, 22.4 mm, 19.0 mm, 16.0 mm, 13.2 mm, 11.20 ran, 9.50 mm, 8.80 mm, 6.70 mm, 5.66 mm, 4.76 mm, 4.00 mm, 3.35 mm 2.80 mm, 2.36 mm, 2.00 mm, 1.70 mm, 1.40 mm, 1.18 mm, 1.00 mm, 0.85 nm, 0.71 mm, 0.60 mm, 0.50 mm, 0.425 mm, 0.355 mm, 0.300 mm, 0.250 mm, 0.212 mm, or 0.180 mm, using a Ro-Tap sieve shaker (produced by SIEVE FACTORY IIDA Co., Ltd.). The weight of the sample on the sieve net was measured; and, based on the cumulative mass distribution curve obtained from, the results, the particle size (median diameter) at which the cumulative mass was 50% was defined as an average particle size.

Density of Foam Molded Body

Immediately after molding, the foam molded body was dried at a temperature of 40° C. for 12 hours; and after drying, the foam molded body was allowed to stand at a temperature of 23±2° C. and humidity of 50±5% for 72 hours. The mass a (g) of the foam molded body that had been allowed to stand was measured to two decimal places, and the apparent volume b (cm$^3$) was obtained by measuring the external dimensions to one hundredth of a millimeter with a Digimatic Caliper (produced by Mitutoyo Corporation). The density of the foam molded body was calculated according to the following equation.

Density of foam molded body (g/cm$^3$) = $a/b$

Rebound Resilience Coefficient of Foam Molded Body

Measurement was performed in accordance with JIS K 6400-3:2011. Two samples of 50 mm×50 mm×20 mm (thickness) cut from the same foam body, which had been allowed to stand for 72 hours or more at a temperature of 23±2° C. and a humidity of 50±5% were overlapped and set in a rebound resilience tester (FR-2, produced by Kobunshi Keiki Co., Ltd.). A steel ball (φ⅝ inch, 16.3 g) freely fell toward the samples from the height of 500 mm (a) the highest rebound height ((b) mm) was read, and the rebound resilience coefficient was calculated according to the following equation. The measurement was conducted three times using the same samples, and their average was defined as the rebound resilience coefficient.

Rebound resilience coefficient (%) = $((b)/(a)) \times 100$

Maximum Point Stress and Elongation at Break of Foam Molded Body

Measurement was performed in accordance with JIS K6767:1999.

Test device: "Autograph AG-K plus 100 kN" universal tester, produced by Shimadzu Corporation Sample: Dumbbell-shaped sample (type 1, defined by ISO1798)

Chuck interval: 100 mm

Test speed: 500 mm/min

Origin of displacement: turning point

Number of tests: N=3

The sample was allowed to stand at a temperature of 23±2° C. and humidity of 50±5% for 24 hours, and then subjected to the test. The sample was pulled until it was cut, and the value obtained by dividing the maximum stress applied during the test by the cross-sectional area of the sample was defined as the maximum point stress (MPa). After the maximum point stress was recorded, the point at which the test stress applied to the sample became 50% of the maximum stress applied to the sample during the test was defined as a break point. The elongation at break (%) was calculated from the strain value L at that time and the original sample length L0 using the following equation.

$$\text{Elongation at break (\%)} = (L/L0) \times 100$$

Example 1

Preparation of Foamable Particles

A polyamide-based elastomer containing a castor oil-derived polyamide 11 block as a hard segment and a polyether block as a soft segment (biobased product content: 44 to 48%, melting point: 14.8° C., Shore D hardness: 42, density: 1.03 g/cm³, melt mass flow rate: 20 to 40 g/10 min) was used as a base resin. 100 parts by mass of the base resin was supplied to a twin-screw extruder. After melt-kneading at 160° C., the resin was further melt-kneaded while the temperature was raised to 220° C. After the base resin in the molten state was cooled, the resin was extruded from each nozzle of a multi-nozzle mold (having four nozzles with a diameter of 1 mm) attached to the front end of the twin-screw extruder, and cut in water at 20 to 50°. The obtained resin particles were cylindrical, with an average length of 1.5 mm and an average diameter of 1.5 mm.

2.0 kg (100 parts by mass) of the obtained resin particles, 3 l of distilled water, and 5 g of a surfactant (aqueous sodium dodecyl benzene sulfonate solution (product containing a pure content of 25%): "Murex R," produced by Yuka Sangyo Co., Ltd.) were introduced into an autoclave with a stirrer having an inner volume of 5 liters, and the autoclave was hermetically sealed. While the mixture was stirred, 15 parts by mass of butane (normal butane: isobutane=7:3 (volume ratio)) as a foaming agent was added thereto under pressure. Subsequently, the temperature inside the autoclave was increased to 100° C., followed by heating for 2 hours, and cooling to 25° C. After the completion of cooling, the pressure in the autoclave was decreased. Immediately thereafter, the surfactant was washed with distilled water, followed by dehydration, thus obtaining foamable particles. The impregnation amount of gas of the foaming agent in the foamable particles was 8.5 mass %.

Preparation of Foam Particles 0.5 parts by mass of an anti-fusing agent (polyoxyethylene polyoxypropylene glycol: "Epan 740", produced by DKS Co., Ltd.) was applied to 2.0 kg (100 parts by mass) of the obtained foamable particles. Thereafter, the particles were introduced into a cylindrical pre-foaming machine equipped with a stirrer having an inner volume of 50 liters, and heated with steam at 0.11 to 0.15 MPa under stirring to foam (pre-foam) the particles, thus obtaining foam particles. The foam particles had a biobased product content of 44 to 48%, a bulk density of 0.13 g/cm³, and an average particle size of 3.2 mm.

Production of Foam Molded Body

The foam particles were placed in a hermetically sealed container (autoclave), nitrogen gas was added under pressure to the sealed container at 0.35 MPa, and the container was allowed to stand at room temperature for 18 hours to impregnate the nitrogen gas into the foam particles (internal pressure application). The impregnation amount of nitrogen gas was 1.1 mass %.

300 g of foam particles removed from the hermetically sealed container were immediately introduced into a molding cavity, having a size of 400 mm×300 mm×thickness 20 mm, of a molding device ("DB-74599PP" produced by DABO) with a pair of molds consisting of a concave mold and a convex mold.

After the completion of introduction, mold-clamping, and heat-molding with steam were performed, thus obtaining a foam molded body. The evaluation of the foam molded body is shown in Table 1.

Example 2

A foam molded body was obtained in the same manner as in Example 1, except that the base resin was changed to another base resin. The evaluation of the foam molded body is shown in Table 1. The base resin is a polyamide-based elastomer containing a castor oil-derived polyamide 11 block as a hard segment and a polyether block as a soft segment, and having a biobased product content of 62 to 66%, a melting point of 167° C., a Shore D hardness of 53, a density of 1.03 g/cm³, and a melt mass flows rate of 20 to 40 g/10 min.

Example 3

A foam molded body was obtained in the same manner as in Example 1, except that the base resin was changed to another base resin. The evaluation of the foam molded body is shown in Table 1. The base resin is a polyamide elastomer containing a castor oil-derived polyamide 11 block as a hard segment and a polyether block as a soft segment, and having a biobased product content of 53 to 57%, a melting point of 167° C., a density of 1.03 g/cm³, and a melt mass flow rate of 20 to 40 g/10 min.

Example 4

A foam molded body was obtained in the same manner as in Example 1, except that the base resin was changed to another base resin. The evaluation of the foam molded body is shown in Table 1. The base resin is a polyamide elastomer containing a castor oil-derived polyamide 11 block as a hard segment and a polyether block as a soft segment, and having a biobased product content of 48 to 52%, a melting point of 165° C., a density of 1.03 g/cm³, and a melt mass flow rate of 20 to 40 g/10 min.

Example 5

A foam molded body was obtained in the same manner as in Example 1, except that the base resin was changed to another base resin. The evaluation of the foam molded body is shown in Table 1. The base resin is a polyamide-based elastomer containing a castor oil-derived polyamide 11 block as a hard segment and a polyether block as a soft segment, and having a biobased product content of 30 to 34%, a melting point of 157° C., a density of 1.03 g/cm³, and a melt mass flow rate of 20 to 40 g/10 min.

Comparative Example 1

A foam molded body was obtained in the same manner as in Example 1, except that the base resin was changed to PEBAX5533 SA01 (produced by Arkema Co., Ltd.). The evaluation of the foam molded body is shown in Table 1. The base resin is a polyamide-based elastomer containing a petroleum-derived polyamide 12 block as a hard segment and a polyether block as a soft segment, and having a biobased product content of 0%, a melting point of 159° C., a Shore C hardness of 54, and a density of 1.01 g/cm³.

Comparative Example 2

A foam molded body was obtained in the same manner as in Example 1, except that the base resin was changed to PEBAX4533 SA01 (produced by Arkema Co., Ltd.). The evaluation of the foam molded body is shown in Table 1. The base resin is a polyamide-based elastomer containing a petroleum-derived polyamide 12 block as a hard segment and a polyether block as a soft segment, and having a biobased product content of 0%, a melting point of 147° C., a Shore C hardness of 46, and a density of 1.01 g/cm³.

Comparative Example 3

A foam molded body was obtained in the same manner as in Example 1, except that the base resin was changed to PEBAX4033 SA01 (produced by Arkema Co., Ltd.). The evaluation of the foam molded body is shown in Table 1. The base resin is a polyamide-based elastomer containing a petroleum-derived polyamide 12 block as a hard segment and a polyether block as a soft segment, and having a biobased product content of 0%, a melting point of 160° C., a Shore D hardness of 42, and a density of 1.00 g/cm³.

TABLE 1

| | Base resin | | Foam molded body | | | | |
|---|---|---|---|---|---|---|---|
| | Biobased product content (%) | Shore D hardness | Biobased product content (%) | Rebound resilience coefficient (%) | Density (g/cm³) | Maximum point stress (MPa) | Elongation at break (%) |
| Example 1 | 44-48 | 42 | 44-48 | 67.7 | 0.13 | 1.31 | 48 |
| Example 2 | 62-66 | 53 | 62-66 | 45.0 | 0.10 | 1.26 | 46 |
| Example 3 | 53-57 | — | 53-57 | 53.3 | 0.14 | 1.54 | 63 |
| Example 4 | 48-52 | — | 48-52 | 58.0 | 0.16 | 1.23 | 59 |
| Example 5 | 30-34 | — | 30-34 | 59.3 | 0.13 | 1.23 | 83 |
| Comparative Example 1 | 0 | 54 | 0 | 52.3 | 0.13 | 0.97 | 26 |
| Comparative Example 2 | 0 | 46 | 0 | 57.4 | 0.15 | 0.69 | 41 |
| Comparative Example 3 | 0 | 42 | 0 | 60.0 | 0.16 | 0.50 | 25 |

The foam molded body obtained by foaming a polyamide-based elastomer base resin containing a plant-derived (castor oil-derived) polyamide block as a hard segment has a lower environmental load, a similar rebound resilience coefficient, and a higher maximum point stress and elongation at break as compared to a foam molded body obtained by foaming a polyamide-based elastomer base resin having a biobased product content of 0%.

The invention claimed is:

1. A polyamide-based elastomer foam molded body comprising 50 to 100 mass % of a block copolymer resin containing a polyamide block as a hard segment and a polyether block as a soft segment,
    the copolymer resin having a biobased product content as measured by ASTM D6866 of 30% or more,
    wherein the polyamide block is polyamide 11 derived from castor oil, and
    wherein the foam molded body is an in-mold foam molded body and is composed of multiple fused bodies of foam particles.

2. The foam molded body according to claim 1, comprising the copolymer resin in an amount of 70 to 100 mass %.

3. The foam molded body according to claim 1, wherein the copolymer resin has a shore D hardness of 25 to 75.

4. The foam molded body according to claim 1, having a density of 0.05 to 0.3 g/cm³.

5. The foam molded body according to claim 1, having a rebound resilience coefficient of 30 to 80%.

6. The foam molded body according to claim 1, wherein the copolymer resin has a biobased product content as measured by ASTM D6866 of 40% or more.

7. The foam molded body according to claim 1, wherein the copolymer resin has a biobased product content as measured by ASTM D6866 of 30 to 80%.

8. The foam molded body according to claim 1, wherein the biobased product content as measured by ASTM D6866 is 15% or more.

9. The foam molded body according to claim 1, which is not an extrusion foam molded sheet.

\* \* \* \* \*